(12) United States Patent
Sievers et al.

(10) Patent No.: US 9,204,509 B2
(45) Date of Patent: Dec. 1, 2015

(54) SYSTEM AND APPARATUS FOR A DUAL LED LIGHT BAR

(71) Applicant: 4S Industries, Inc., San Carlos, CA (US)

(72) Inventors: Lisa Sievers, San Carlos, CA (US); Steven A. Sievers, San Carlos, CA (US); Dylan James Sievers, San Carlos, CA (US)

(73) Assignee: 4S Industries, Inc., San Carlos, CA (US)

( * ) Notice: Subject to any disclaimer, the term of this patent is extended or adjusted under 35 U.S.C. 154(b) by 302 days.

(21) Appl. No.: 13/865,978

(22) Filed: Apr. 18, 2013

(65) Prior Publication Data

US 2013/0278139 A1    Oct. 24, 2013

Related U.S. Application Data

(60) Provisional application No. 61/636,585, filed on Apr. 20, 2012.

(51) Int. Cl.
*B60Q 1/14* (2006.01)
*H05B 33/08* (2006.01)

(52) U.S. Cl.
CPC ........ *H05B 33/0821* (2013.01); *H05B 33/0803* (2013.01); *H05B 33/0815* (2013.01); *Y02B 20/346* (2013.01)

(58) Field of Classification Search
CPC .................................................... B60Q 3/0293
USPC .......................................................... 315/77
See application file for complete search history.

(56) References Cited

U.S. PATENT DOCUMENTS

| | | | |
|---|---|---|---|
| 6,206,537 B1 | 3/2001 | Hauck | |
| 8,277,077 B2 | 10/2012 | Georgitsis | |
| 8,287,144 B2 | 10/2012 | Pedersen | |
| 8,325,029 B2 | 12/2012 | Brooking | |
| 2006/0232219 A1* | 10/2006 | Xu | 315/209 R |
| 2010/0085181 A1 | 4/2010 | Brooking et al. | |
| 2010/0295468 A1 | 11/2010 | Pedersen et al. | |
| 2011/0074300 A1 | 3/2011 | Hsu | |
| 2013/0033857 A1 | 2/2013 | Lin | |

FOREIGN PATENT DOCUMENTS

CN         201203009 Y        4/2009

OTHER PUBLICATIONS

PR Newswire, AR Optics: The World's First White and Amber Color Mixed Offroad Light Bar with Independent Control, http://www.prnewswire.com/news-releases/ar-optics-the-worlds-first-white-and-amber-color-mixed-offroad-light-bar-with-independent-control-204844091.html.

(Continued)

*Primary Examiner* — Daniel Puentes
(74) *Attorney, Agent, or Firm* — Lisa Foundation Patent Law Clinic at Arizona State University

(57) ABSTRACT

A variable color light system includes multiple dual color light emitting diodes (LED's) arranged in a light bar. The dual LED's are arranged with a common cathode and two anodes. The light system includes a switch that controls the power to the light system. The system is controlled to power a first anode, a second anode, or neither anodes. When the first anode is powered, the dual LED's emit a first color. When the second anode is powered, the dual LED's emit a second color. The light system is LED driven. The dual LED light system can be used in a light bar that can be used on a vehicle, an off-road vehicle, a recreational vehicle, or a boat.

25 Claims, 9 Drawing Sheets

(56) References Cited

OTHER PUBLICATIONS

Aurora 4x4 off road Led light bar 100W, http://szaurora.en.alibaba.com/product/691177551-214780347/Aurora__4x4__off__road__Led__light__bar__100W.html.

10inch off road led light, http://szaurora.en.alibaba.com/product/511759280-214780341/10inch__off__road__led__light.html.

Mike Lyon, Holder Off-Road LED Light Bar, Off-Road.com (Sep. 1, 2007), http://sandsports__off-road.com/trucks-4x4/feature/holder-offroad-led-light-bar-13335.html.

International Search Report and Written Opinion for PCT/US2013/037467 mailed Aug. 29, 2013 (7 pages).

\* cited by examiner

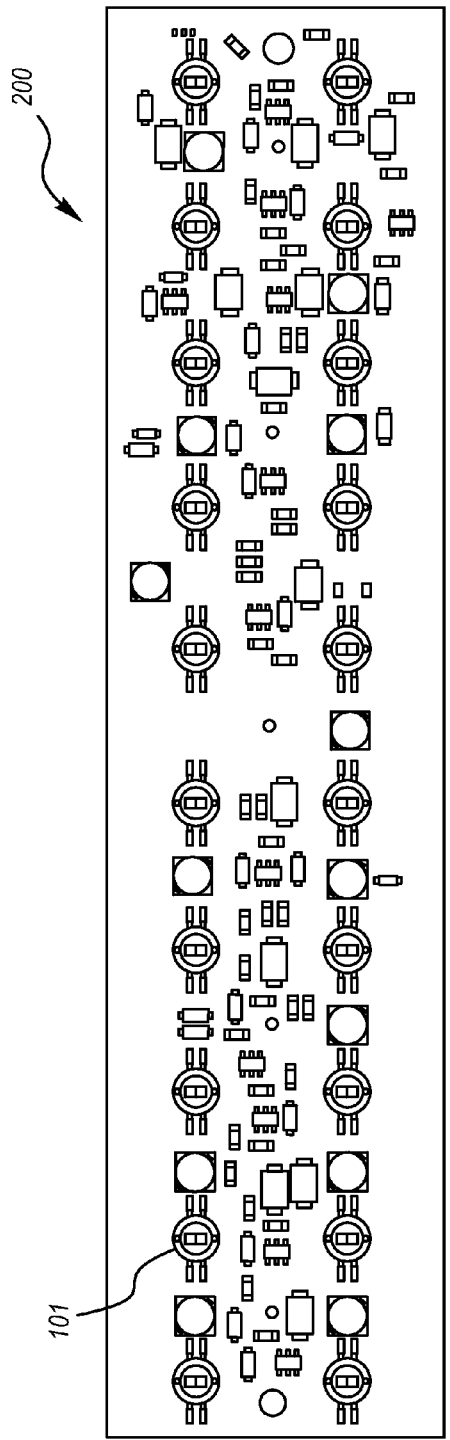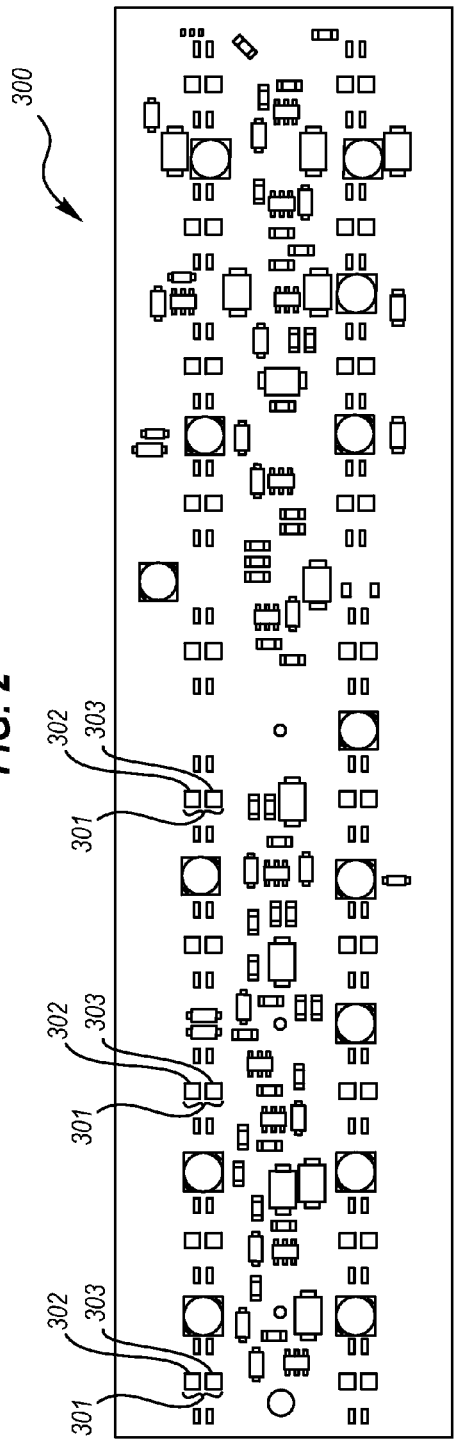
FIG. 2
FIG. 3

SYSTEM AND APPARATUS FOR A DUAL LED LIGHT BAR

CROSS REFERENCE TO RELATED APPLICATION

This application claims priority to U.S. provisional application number 61636585, entitled, "System and Apparatus for a Dual LED Light Bar," filed on Apr. 20, 2012, which is hereby incorporated by reference.

BACKGROUND OF THE INVENTION

1. Field of the Invention

This invention relates generally to the field of lighting using variable color light emitting diodes (LED's).

2. Description of Related Art

LED's are used in various types of light systems, including indoor and outdoor lighting, automobile lighting and accessory lighting. LED's are useful in providing energy efficient bright light in various different colors. In vehicle accessory lighting, LED's can be used in light bars that can be mounted to vehicles, such as off road trucks, four-wheelers, racing vehicles, farm equipment, and recreational vehicles, or boats. Light bars that mount to vehicles typically use one or multiple rows of LED's of a single color. If multiple colors are desired in one high-power light bar, the light bar is typically equipped with a first array of single-color LED's in one color, and a second array of a single-color LED's in a different color. In these light bars, when the first array of single-color LED's is turned on, the first array of LED's emits a color. To emit the second color, the first array of LED's is turned off and a second group of single-color LED's is turned on. For example in a prior art light bar, a white and amber light bar may have a row of ten white LED's and a row of ten amber LED's for a total of twenty LED's. When a user selects the white light to be emitted, the ten white LED's are turned on, while the ten amber LED's are turned off. When a user selects the amber light, the ten amber LED's are turned on, and the ten white LED's are turned off. In the current variable color light bars, a given area of LED's is not being used when that color is turned off. This causes light output to be less in a variable color light bar than in a single-color light bar, because fewer LED's are being used to emit one color. In this prior art example, only ten LED's can emit white light. If the user desired more white light, the user could replace the amber LED's with white LED's and lose the amber lighting. Or, the user could add an additional light bar, which would take up more space on the vehicle.

So as to reduce the complexity and length of the Detailed Specification, and to fully establish the state of the art in certain areas of technology, Applicant(s) herein expressly incorporate(s) by reference all of the following materials identified in each numbered paragraph below.

U.S. Publication No. 2011/0074300 of Hsu describes a dual colored LED decoration lamp. Two individual single-color LED's of different colors are cross-linked together and then placed in a string where the string is powered in one direction at a time. Thus, two single-color LED's are placed close together, each making half of the dual colored LED.

U.S. Pat. No. 8,325,029 of Brooking describes a dual color light bar using a pair of light emitting chips for each of a plurality of light emitting diodes where one light emitting chip is energized at a time to produce one of two different colors of light.

U.S. Pat. No. 8,325,029 of Georgitsis describes a lighting systems configured to provide vehicle lighting using light emitting diodes (LED'S).

U.S. Pat. No. 8,287,144 of Pedersen describes LED bar modules comprising a number of LED groups where the LED groups comprise a number of LED's that have different colors where the LED's are electrically coupled to a color controller for generating light with changing colors.

U.S. Publication 20130033857 of Lin describes a LED light bar with separated portions located on the housing with LED package devices disposed on a circuit board where the LED package devices of each of the groups forms a closed loop.

Applicant(s) believe(s) that the material incorporated above is "non-essential" in accordance with 37 CFR 1.57, because it is referred to for purposes of indicating the background of the invention or illustrating the state of the art. However, if the Examiner believes that any of the above-incorporated material constitutes "essential material" within the meaning of 37 CFR 1.57(c)(1)-(3), applicant(s) will amend the specification to expressly recite the essential material that is incorporated by reference as allowed by the applicable rules.

BRIEF SUMMARY OF THE INVENTION

The present invention provides among other things a variable color LED light system. The light system provides efficient lighting using dual-color or tri-color LED's. Each dual LED used in the light system is configured to emit at least two colors depending on which electrical lead is connected to power. The light system can be used in automobiles, boats, recreational vehicles, off road vehicles, and the like.

In one embodiment, the invention provides a plurality of LED's arranged in a light bar wherein each group of the plurality of LED groups comprises at least two LED's. A first LED of an LED group from the plurality of LED groups is configured to emit a first color upon application of a voltage to a first anode on the first LED. A second LED in a same LED group as the first LED from the plurality of LED groups is configured to emit a second color upon application of a voltage to a second anode on the second LED. There may be at least one electrical bus electrically coupled to the plurality of LED groups and configured to turn on or off one of the first color of the first LED and the second color of the second LED when the electrical bus electrically coupled to at least the first and second anodes is electrically coupled to at least one switch. The switch may include at least three settings including a first ON setting creating a low resistance electrical coupling between the first anode of the first LED and the switch input, an OFF setting creating high resistance electrical coupling between the first anode of the first LED and the second anode of the second LED and the switch input, and a second ON setting creating a low resistance electrical coupling between the second anode of the second LED and the switch input. Each LED group of the plurality of LED groups may be separately coupled to the electrical bus. The first LED and second LED may be in a same package wherein the emitted light from the first and second LED's co-illuminates a lens. The first LED and second LED may be electrically coupled to the electrical bus through a LED driver. The first LED and second LED may be mounted directly on a printed circuit board and heat sink wherein the emitted light from the first and second LED's co-illuminate a lens. There may be a third LED in the same LED group as the first LED and the second LED, the third LED configured to emit a third color upon application of a voltage to a third anode on the third LED. The third anode may be electrically coupled to the electrical bus and the switch may further comprise a third ON position that creates a low resistance electrical coupling between the third anode of the third LED and the input of the switch. The first LED, second LED, and third LED may be in a same package. The first LED, the second LED, and the third LED may be mounted directly on a printed circuit board and heat sink. The first LED, the second LED, and the third LED may emit light to co-illuminate a lens. The plurality of LED's may include twenty LED's arranged in two rows in the light bar. The plurality of LED's may include twenty LED's arranged in one rows in the light bar. The first color may be white and the second color may amber or any other solid color. The light bar may be configured to couple to a vehicle, an off-road vehicle, a recreational vehicle, or a boat. Additional resistance may be added to the anode of the first or second LED to reduce the current flow to the first LED or the second LED. In other embodiments, the invention may include a variable color light display device, comprising a plurality of variable color light emitting diode (LED) groups arranged in a light bar, each of the plurality of variable color LED groups configured to separately couple to at least one electrical bus and further comprising LED's having at least three electrical contacts. There may be a first electrical contact common to the plurality of variable color LED groups that is coupled to a first bus. There may be a second electrical contact is electrically coupled to a first color of the variable color LED groups and is electrically coupled to a second bus. There may be a third electrical contact is electrically coupled to a second color of the variable color LED groups and is electrically coupled to a second bus. There may be a fourth electrical lead coupled to a third color of the variable color LED's. The invention may be configured to turn on the first color and the second color when a voltage source is electrically coupled to the first and second electrical buses where complete a circuit for the first color is realized by electrically coupling the second electrical bus to the voltage source and a complete a circuit for the second color is realized by electrically coupling the third electrical bus to the voltage source. The variable color LED's may be turned off by disconnecting both the second electrical bus and the third electrical bus from the voltage source.

There may be plurality of variable color LED's are arranged in a light bar. The light bar may be configured to couple to a vehicle, an off-road vehicle, a recreational vehicle, or a boat. The plurality of variable color LED's may be dual-color LED chips.

In still other embodiments, the invention may include a display device having a plurality of variable color light emitting diodes (LED) among a plurality of LED groups. There may be a first display area configured to display at least two colors of the LED groups. There may be an electrical bus coupled to the variable color LED's and configured to turn on one of the first color and the second color of the variable color LED's when electrical current flows from the electrical bus to the plurality of LED groups, wherein each LED group has a separate electrical coupling to the electrical bus. The first display area may be a light bar. The light bar may be configured to couple to a vehicle, an off-road vehicle, a recreational vehicle, or a boat. The light bar may comprise twenty dual LED's arranged in at least one row. The light bar may comprise twenty dual LED's arranged in two rows. The variable color LED's may be variable color LED's, each variable color LED configured to emit at least two colors.

Aspects and applications of the invention presented here are described below in the drawings and detailed description of the invention. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. §112(f). Thus, the use of the words "function," "means" or "step" in the Detailed Description or Description of the Drawings or claims is not intended to somehow indicate a desire to invoke the special provisions of 35 U.S.C. §112(f), to define the invention. To the contrary, if the provisions of 35 U.S.C. §112(f) are sought to be invoked to define the inventions, the claims will specifically and expressly state the exact phrases "means for" or "step for, and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventors not to invoke the provisions of 35 U.S.C. §112(f). Moreover, even if the provisions of 35 U.S.C. §112(f) are invoked to define the claimed inventions, it is intended that the inventions not be limited only to the specific structure, material or acts that are described in the preferred embodiments, but in addition, include any and all structures, materials or acts that perform the claimed function as described in alternative embodiments or forms of the invention, or that are well known present or later-developed, equivalent structures, material or acts for performing the claimed function.

BRIEF DESCRIPTION OF THE SEVERAL VIEWS OF THE DRAWINGS

A more complete understanding of the present invention may be derived by referring to the detailed description when considered in connection with the following illustrative figures. In the figures, like reference numbers refer to like elements or acts throughout the figures.

FIG. 2 depicts a circuit board layout, according to one embodiment of the present invention.

FIG. 3 depicts a circuit board layout, according to another embodiment of the present invention.

Elements and acts in the figures are illustrated for simplicity and have not necessarily been rendered according to any particular sequence or embodiment.

DETAILED DESCRIPTION OF THE INVENTION

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. The full scope of the inventions is not limited to the examples that are described below.

Conventional LED light bars with high intensity light output suitable for off-road vehicles, recreational vehicles, or boats found in the art generally use single color LED lamps and output light with only a single color. Variable color LED light bars with continuous or flashing high power light output are desired in many applications such as off-road vehicles, a recreational vehicles, and boats where additional high intensity lighting with a different color is needed. LED light bars require continuous high efficiency, high reliability operation. At the same time they need to be compact, lightweight, and rugged. Realizing high power variable color LED output power using conventional LED light bars found in the art would require a light bar of double the size of a single color LED light bar with a given power since additional LED's and supporting driver circuitry would need to be realized to support the additional light color. Conventional variable color LED light bars lack the ability to power high power LED's in part because high power LED's require relatively high currents that may approach 1 ampere. The conventional variable color light bars cannot support this high current for large numbers of LED's needed for a high power light bar; a typical high power LED light bar may require 10, 20 or more LED's. In addition, structures for realizing efficient, compact dual LED light bars that allow for arbitrarily sized LED light bars from just 4-6 LED's to LED light bars with 20, 40, 80 or more LED emitters is desired. The present invention addresses the need for compact, lightweight, high power, variable color LED light bars that are highly scalable by providing a modular circuit architecture based on "groups" of variable color LED's where the LED groups are coupled separately to an electrical bus that supplies the power needed to drive the LED's.

Figure 1:
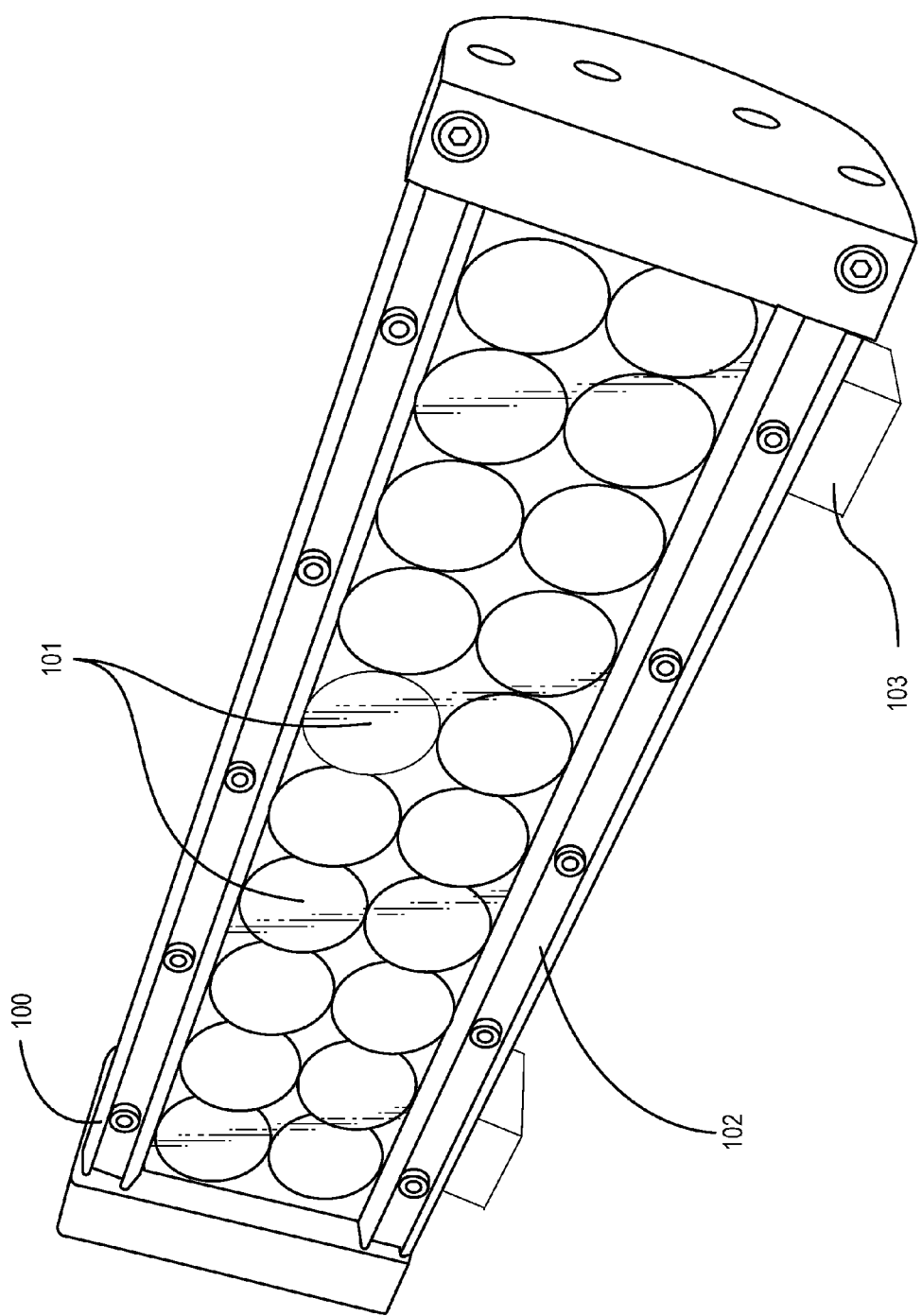
FIG. 1 representatively depicts a perspective view an embodiment of the light bar.

In one application of the invention, referring now to FIG. 1, a light bar according to various aspects of the invention is depicted in perspective view. In the embodiment pictured in FIG. 1, the light bar 100 comprises two rows of LED's 101 within a housing 102. The LED's 101 may be dual-color LED's, tri-color LED's, pairs or trios of single LED's. In one embodiment of the invention, the light bar 100 includes twenty dual LED's 101. In other embodiments of the invention, pairs or trios of single LED's may be used in place of dual-color or tri-color LED's. Therefore, without loss of generality, it should be understood that references to "dual LED's" or "triple LED's" may also refer to pairs or trios of single LED's placed separately on the circuit board. The light bar is not limited to twenty dual LED's or pairs of LED's. Any number of LED's can be used in the light bar system. The dual LED's 101 each emit two different colors. The colors emitted by the LED's 101 depend on the diode used, and could be any color. As an example, the dual LED's 101 are diodes that emit both amber and white light. In other embodiments, any solid color may be used for the dual LED's 101. When a voltage is applied to a first anode, all twenty dual LED's 101 in the light bar 100 emit amber-colored light. When a voltage is applied to a second anode, all twenty dual LED's 101 in the light bar 100 emit white light. The LED's 101 may be surrounded by a reflective material to reflect the light emitted by the LED's. The housing 102 may be comprised of any suitable material for supporting the LED's 101, such as metal, plastic, fiberglass or the like. The light bar 100 also comprises a mounting portion 103 where the light bar 100 can mount to a vehicle or boat. The LED's 101 could also be tri-color LED's. Tri-color LED's emit a third color, for example, red, when a voltage is applied to a third anode. LED's with one, two, or three colors described here are exemplary. Any number of LED's may be used without departing from the scope of the invention.

FIG. 2 depicts the circuit board layout 200 for an embodiment of the dual LED light bar system. In the embodiment of FIG. 2, the circuit board layout 200 comprises twenty dual LED's 101. Each of the dual LED's 101 has at least three leads: either two anodes and a common cathode or two cathodes and a common anode. Various dual-color LED chips will operate in the circuit board layout 200 of FIG. 2. In one embodiment of the circuit board layout 200, the dual-color LED's 101 each light up in either color depending on which lead is coupled to a voltage. For example in FIG. 2, when the amber anode of each dual LED 101 is coupled to a voltage, each of the twenty dual LED's 101 emits amber light. When the white anode of each dual LED 101 is coupled to a voltage, each of the twenty dual LED's 101 emits white light.

In another embodiment of FIG. 2, the dual LED's 101 have at least three leads: a cathode and two anodes. One of the anodes includes a resistor that allows the first color of the dual LED 101 to receive less power. The second anode of the dual LED 101 does not include the resistor thereby receiving full power. This embodiment can be used, for example, in brake lights. When the first anode is coupled to a voltage, the first color of the dual LED 101 is emitted at less than full brightness. When the second anode is coupled to a voltage, the second color of the dual LED 101 emits at full brightness. When used for brake lights, both colors of the dual LED 101 may be red. In this example, the first diode in the dual LED 101 would receive half power when the vehicle lights were on, thus allowing running lights. The second diode in the dual LED 101 would receive full power when the vehicle brakes were used, allowing the second diode to emit a brighter light to indicate braking FIG. 3 depicts the circuit board layout 300 for an embodiment of the dual LED light bar system. In the embodiment of FIG. 3, the circuit board layout 300 comprises twenty LED pairs 301 where each pair comprises two single LED's. Each of the first single LED's 302 and second single LED's 303 within the pairs of LED chips 301 has at least two contacts: either one or two anodes and a common cathode or two cathodes and a common anode. Various single-color LED's will operate in the circuit board layout 300 of FIG. 3. The LED pairs 301 are mounted to the printed circuit board that generally comprises a high thermal conductivity material to provide adequate heat sinking for the LED's. The LED pairs 301 are mounted to the printed circuit board and heat sink using pick and place techniques. The LED pairs 301 may comprise semiconductor chips or packaged single-color LED's. The pairs of LED chips 301 are electrically coupled to the circuit through contacts on the backside of the chips. The LED chips 302 and 303 may be mounted to the printed circuit board using soldering. In the present embodiment of the circuit board layout 300, either a first color of LED chips 302 each emit light in either color depending on which LED chip 302 or 303 is coupled to a voltage. For example in FIG. 3, the first LED 302 of the pair of LED chips 301 may be configured to emit amber-colored light and the second LED 303 may be configured to emit white light. When the anode of the first LED 302 is coupled to a voltage, each of the first LED's 302 of the LED pairs 301 emits amber light. When each second LED 303 of each LED pair 301 is coupled to a voltage, each of the second LED's 303 of the LED pairs 301 emits white light.

Figure 4:
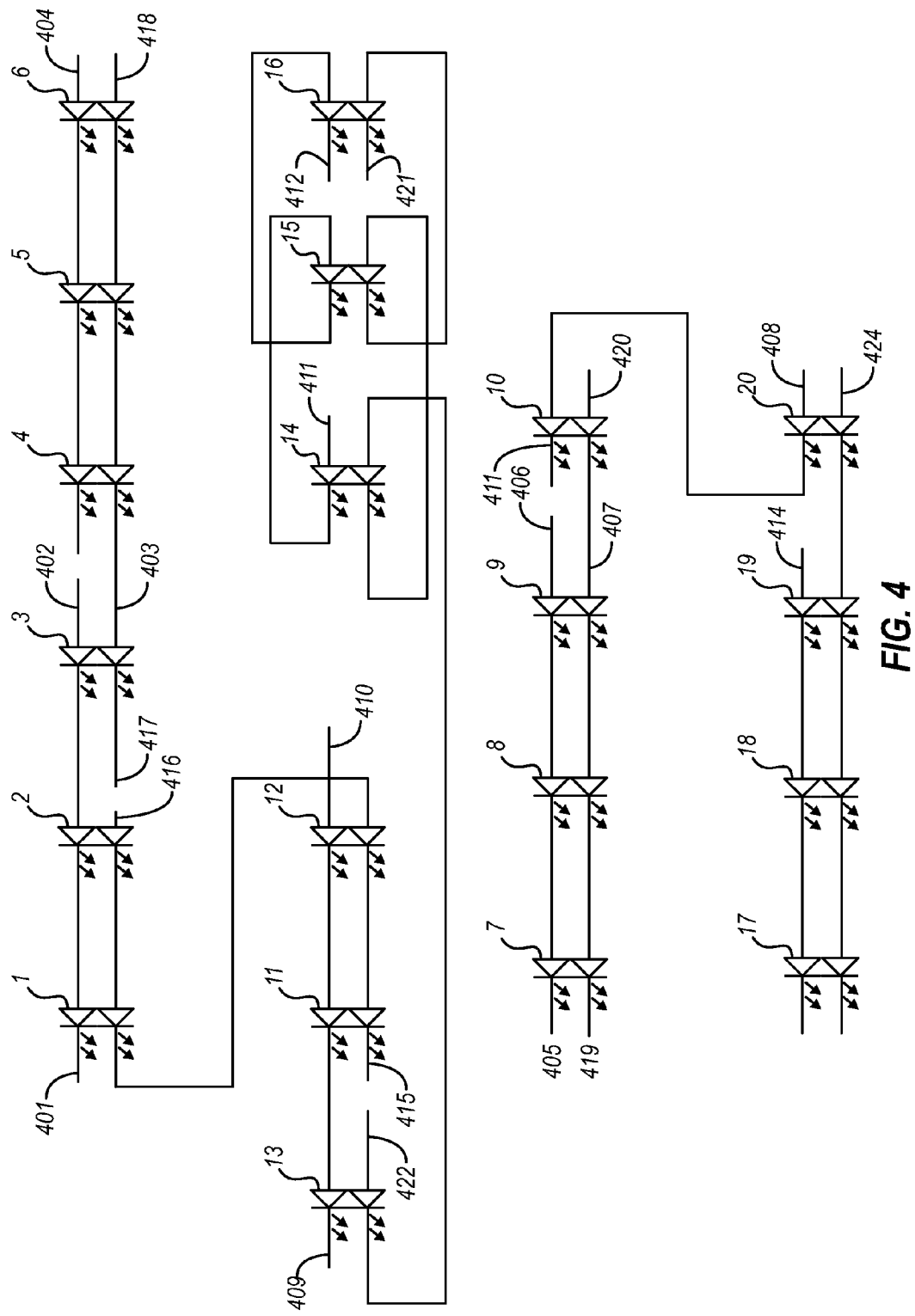
FIG. 4 depicts schematics of the overall device, according to one embodiment of the present invention.

Analogous to the description of FIG. 2, in another embodiment of FIG. 3, two LED's each with a first anode and a first cathode may be used. One of the anodes of one of the LED's includes a resistor that allows the first LED 302 color of the LED pair 301 to receive less a voltage. The second LED 303 in the LED pair 301 does not include the resistor thereby receiving full power. Analogous to FIG. 2, this embodiment can be used, for example, in brake lights. When the first anode is coupled to a voltage, the first LED 302 of the LED pair 301 is emitted at less than full brightness. When the second LED 303 is coupled to a voltage, the second color of the LED pair 301 emits at full brightness. When used for brake lights, both colors of the LED pair 301 may be red. In this example, the first LED 302 in the LED pair 301 would receive half power when the vehicle lights were on, thus allowing running lights. The second LED 303 in the LED pair 301 would receive full power when the vehicle brakes were used, allowing the second diode to emit a brighter light to indicate braking FIG. 4 depicts schematics of an embodiment of the circuitry for the light bar system. In the embodiment depicted by FIG. 3, each of the twenty dual LED's 1, 2, 3, 4, 5, 6, 7, 8, 9, 10, 11, 12, 13, 14, 15, 16, 17, 18, 19, and 20 ("1-20") may be dual-color LED's, also called bi-color LED's. These LED's may also comprise pairs of separate discrete LED's. The twenty dual LED embodiment in FIG. 4 is meant to show one configuration of many configurations that could comprise dual LED light bars. The light bar system is not limited to twenty LED, and may contain any number of LED's. The dual LED's 1-20, shown symbolically in FIG. 4, can be powered by direct current (DC) input. Each LED within a LED group is biased by an LED driver. For clarity, the details of the driver is not shown in FIG. 4; FIGS. 5-10 show the details and connections of the LED to the LED drivers. Each LED group is coupled to the other LED sets by a common electrical ground. To enable high-power operation, the dual LED's 1-20 are broken into groups wherein each group has independent control and an independent connection to the electrical bus connections to anodes 401-424 that, during operation, supplies power to the dual LED's. This configuration allowing independent control and independent electrical coupling to the bus provides for high power scalability of the system, provides low resistance connections to the LED's, and prevents issues with excessive current and associated joule heating and electro-migration deterioration of the conductors in the circuitry. For example in FIG. 4, LED pairs 1, 2, and 3 comprise one LED group for a first color. Similarly, LED pairs 4, 5, and 6 comprise another LED group for a first color. An LED group for the second color includes LED's 3, 4, 5, and 6. The LED groups are depicted in more detail in FIGS. 4-9.

In the embodiment of the light bar depicted by the schematics of FIG. 4, there are twelve LED groups, seven LED groups for a first color, and five LED groups for a second color. In the example in FIG. 4, anodes 402, 404, 406, 408, 410, 411, and 414 are coupled to the dual LED's such that each dual LED 1-20 emits a first color when a voltage is supplied to anodes 402, 404, 406, 408, 410, 411, and 414. Each of the LED groups is electrically coupled to a common cathode or ground.

Anode 402 is electrically coupled to LED 3 and cathode 401 is electrically coupled to LED 1 as part of a first LED group comprising dual LED's 1, 2, and 3. When a voltage is applied to anode 402, LED's 1, 2, and 3 emit a first color. Anode 404 is coupled to LED 6 and cathode 403 is coupled to LED 4 as part of a second LED group comprising LED 4, 5, and 6. When a voltage is applied to anode 404, LED's 4, 5, and 6 emit a first color. Anode 406 is coupled to LED 9 and cathode 405 is coupled to LED 7 as part of a third LED group comprising LED's 7, 8, and 9. When a voltage is applied to anode 406, LED's 7, 8, and 9 emit a first color. Anode 408 is coupled to LED 20 and cathode 407 is coupled to LED set 10 as part of a fourth LED group comprising dual LED 10 and 20. When a voltage is applied to anode 408, LED s 10 and 20 emit a first color. Anode 410 is coupled to LED 12 and cathode 409 is coupled to LED 13 as part of a fifth LED group comprising LED's 11, 12, and 13. When a voltage is applied to anode 410, dual LED s 11, 12, and 13 emit a first color. Anode 411 is coupled to LED 14 and cathode 412 is coupled to LED set 16 as part of a sixth LED group comprising LED's 14, 15, and 16. When power is applied to anode 411, dual LED sets 14, 15, and 16 emit a first color. Anode 314 is coupled to LED 19 and cathode 413 is coupled to LED 17 as part of a seventh LED group comprising LED's 17, 18, and 19. When a voltage is applied to anode 414, dual LED's 17, 18, and 19 emit a first color.

In the example in FIG. 4, anodes 416, 418, 420, 422, and 424 are coupled to the corresponding LED's such that each LED's 1-20 emit a second color when a voltage is supplied to anodes 416, 418, 420, 422, and 424. Each of the LED groups is electrically coupled to a common cathode or ground. Anode 416 is coupled to LED set 2 and cathode 415 is coupled to LED 11 as part of an eighth LED driven group comprising dual LED s 1, 2, 11, and 12. When voltage is applied to anode 416, dual LED sets 1, 2, 11, and 12 emit a second color. Anode 418 is coupled to LED 6 and cathode 417 is coupled to LED 3 as part of a ninth LED group comprising dual LED's 3, 4, 5, and 6. When power is applied to anode 418, dual LED s 3, 4, 5, and 6 emit a second color. Anode 420 is coupled to LED 10 and cathode 419 is coupled to LED 7 as part of a tenth LED driven group comprising dual LED sets 7, 8, 9, and 10. When a voltage is applied to anode 420, LED sets 7, 8, 9, and 10 emit a second color. Anode 422 is coupled to LED 13 and cathode 321 is coupled to LED 16 as part of an eleventh LED driven group comprising LED sets 13, 14, 15, and 16. When a voltage is applied to anode 422, dual LED's s 13, 14, 15, and 16 emit a second color. Anode 424 is coupled to LED 20 and cathode 423 is coupled to LED 17 as part of a twelfth LED group comprising dual LED's 17, 18, 19, and 20. When a voltage is applied to anode 424, LED sets 17, 18, 19, and 20 emit a second color.

Figure 5:
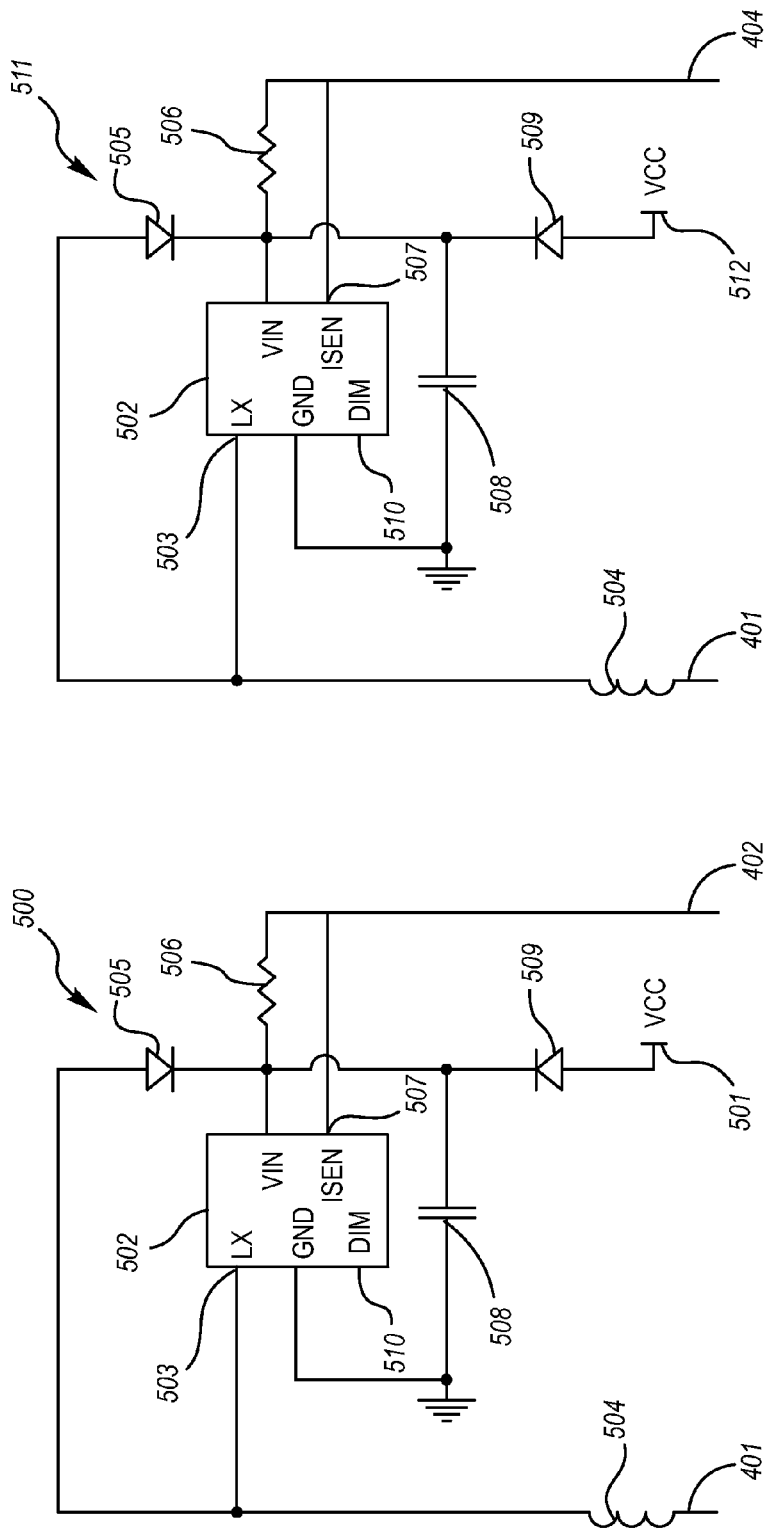
FIGS. 5-10 depict partial and more detailed schematics of the device, according to one embodiment of the present invention.

FIGS. 5-10, depict more detailed schematics of the light bar according to one embodiment. FIG. 5 shows an LED driver 500 used to electrically couple a first LED group with cathode 401 and anode 402 for a first color to an electrical bus at coupling point 501 and a LED driver 511 for a second LED group with cathode 403 and anode 404 for a second color connected to an electrical bus at coupling point 512. The LED driver 500 generally operates as a continuous mode Buck converter used to step the voltage down from the supply voltage 501 of 6-30V down to a voltage of 3-5 V between the anode 402 and the cathode 401. The LED driver 500 employs an integrated circuit 502 configured to apply an alternating high and low impedance coupling to a voltage source or ground at terminal 503 that produces a voltage drop across inductor 504 during a low impedance state as the inductor 504 initially resists current flow. When terminal 503 goes into a high impedance state, the magnetic field of inductor 504 discharges, allowing current to flow through diode 505. The net effect is that the average voltage seen between the anode 402 and the cathode 401 is reduced because of the voltage drop across inductor 504. The resulting current applied through anode 402 is sensed by the voltage drop across resistor 506 at terminal 507 of integrated circuit 502. To control the current through the LED the integrated circuit 502 adjusts the duration of the high and low impedance states produced at terminal 503 to adjust the average voltage between anode 402 and cathode 401. A capacitor 508 is used to smooth the ripple caused by the varying voltage across the inductor 504. Diode 509 is used to isolate the bus connection 501 from spurious transient voltages. Terminal 510 of integrated circuit 502 may be used to enable dimming of the light by applying a low voltage below 0.3 V for no light out put and up to 2.5 V for maximum light output. The operation of the LED driver with respect to anode 404 and cathode 403 is identical to that described above.

Figure 6:
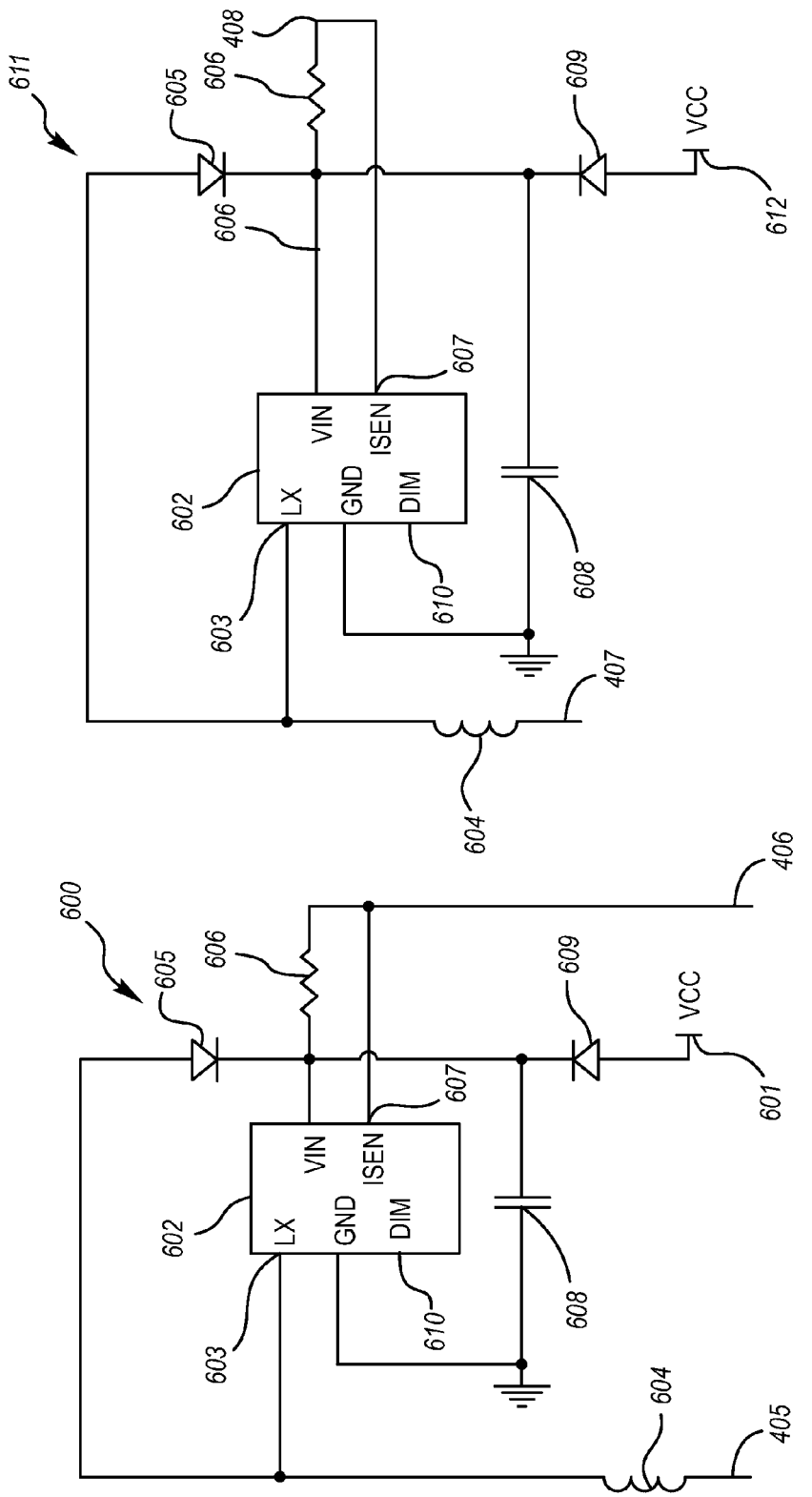

FIG. 6 shows an LED driver 600 for a third LED group that electrically couples with cathode 405 and anode 406 for a first color to an electrical bus at point 601. FIG. 6 also shows a LED driver 611 for a fourth LED group with cathode 407 and anode 408 for a first color that couples to an electrical bus at point 612. Components 502-510 in FIG. 6 function identically to correspondingly numbered items in FIG. 5.

Figure 7:
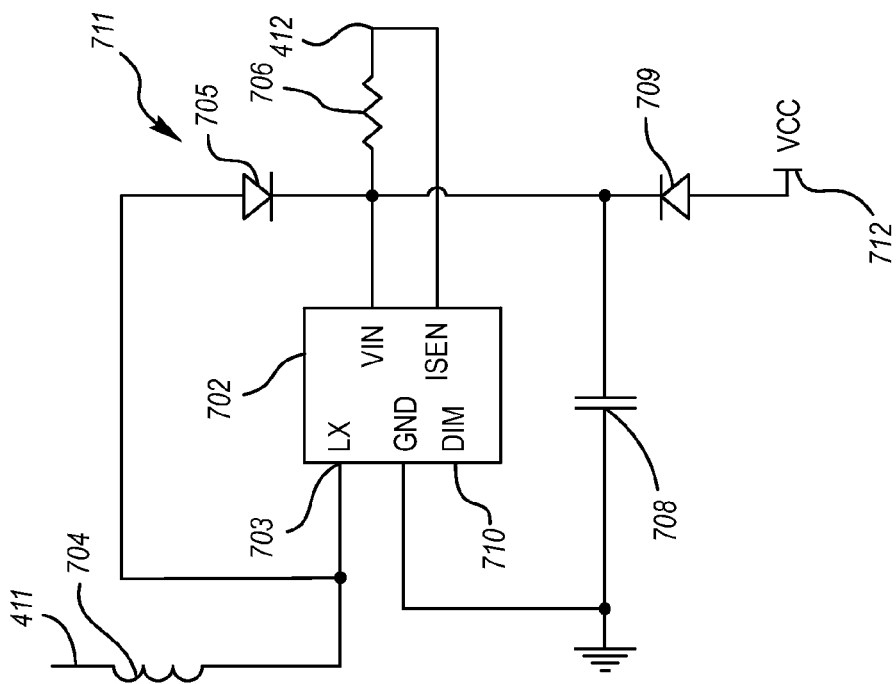
Figure 7:
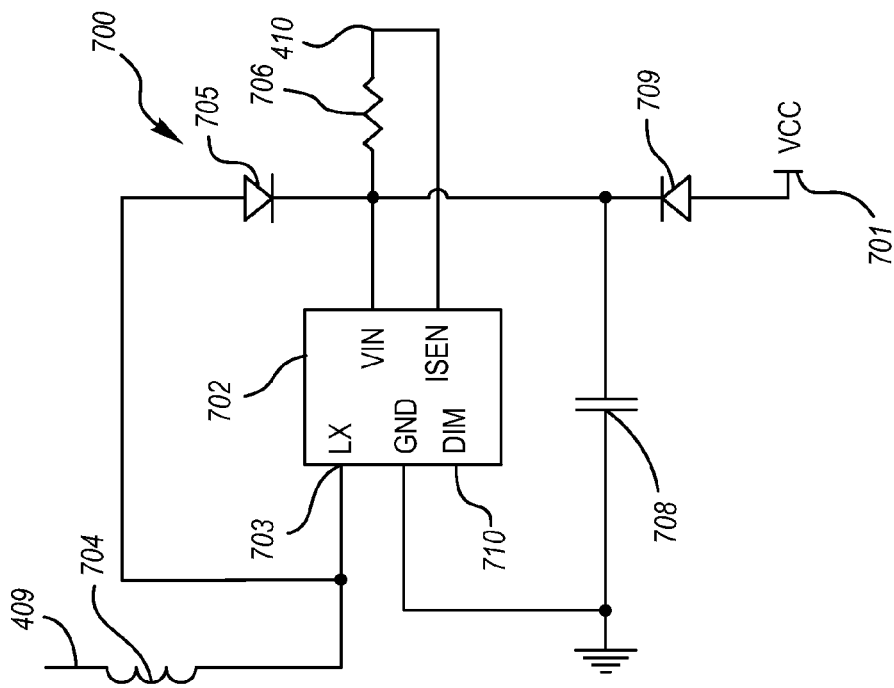

FIG. 7 shows an LED driver 700 for a third LED group that electrically couples with cathode 409 and anode 410 for a first color to an electrical bus at point 701. FIG. 7 also shows a LED driver 711 for a fourth LED group with cathode 411 and anode 412 for a first color that couples to an electrical bus at point 712. Elements 702-710 in FIG. 7 are identical to elements 502-510 in FIG. 5.

Figure 8:
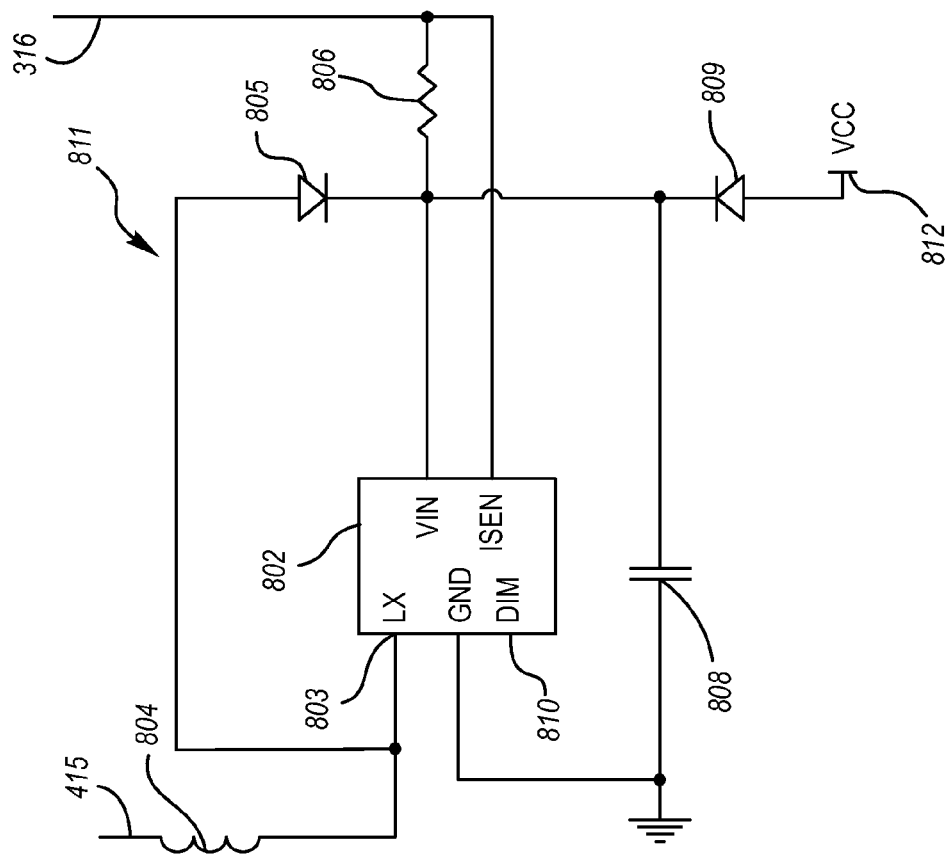
Figure 8:
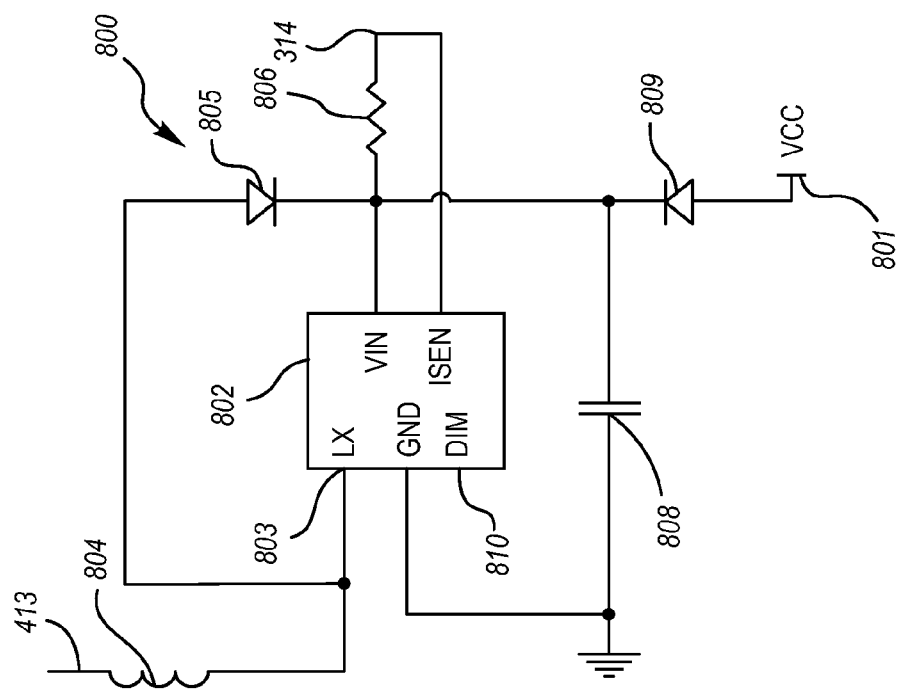

FIG. 8 shows an LED driver 800 for a third LED group that electrically couples with cathode 413 and anode 414 for a first color to an electrical bus at point 801. FIG. 7 also shows a LED driver 811 for a fourth LED group with cathode 415 and anode 416 for a first color that couples to an electrical bus at point 812. Elements 802-810 in FIG. 8 are identical to elements 502-510 in FIG. 5.

Figure 9:
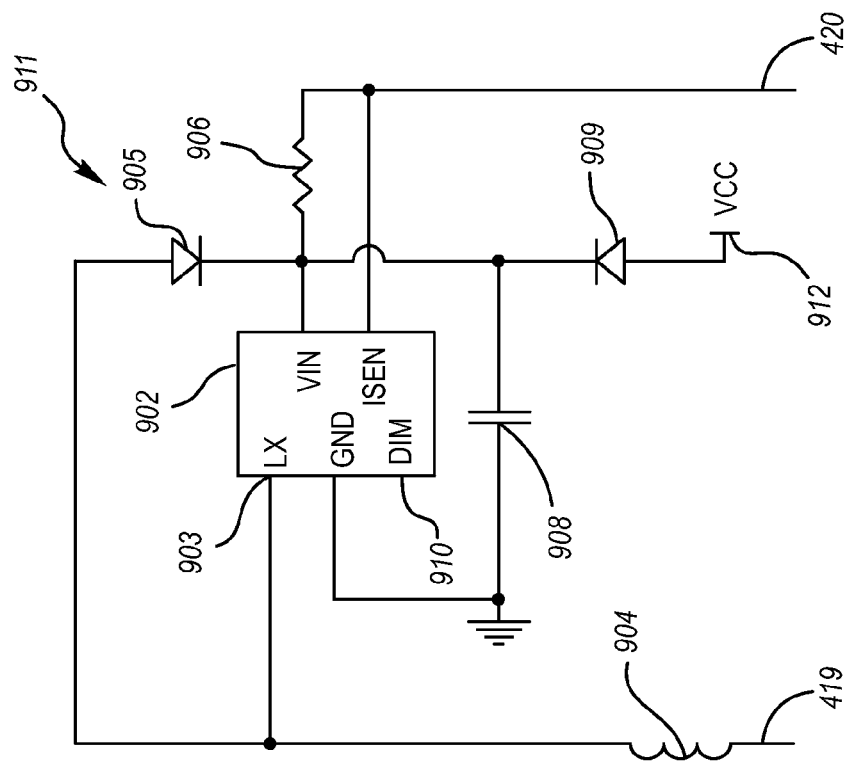
Figure 9:
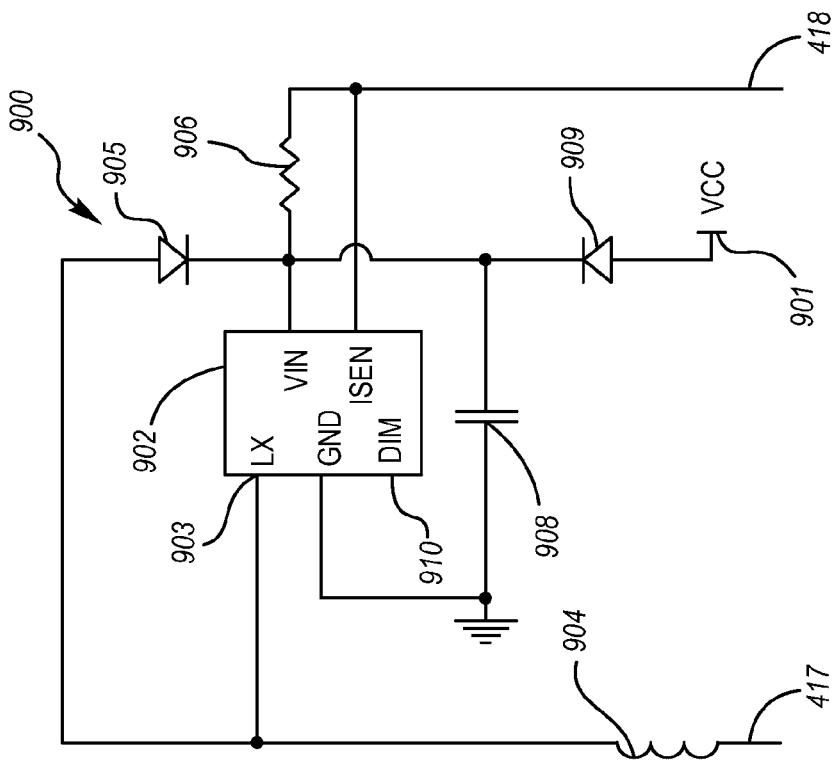

FIG. 9 shows an LED driver 900 for a third LED group that electrically couples with cathode 417 and anode 418 for a first color to an electrical bus at point 901. FIG. 9 also shows a LED driver 911 for a fourth LED group with cathode 419 and anode 420 for a first color that couples to an electrical bus at point 912. Elements 802-810 in FIG. 8 are identical to elements 502-510 in FIG. 5.

Figure 10:
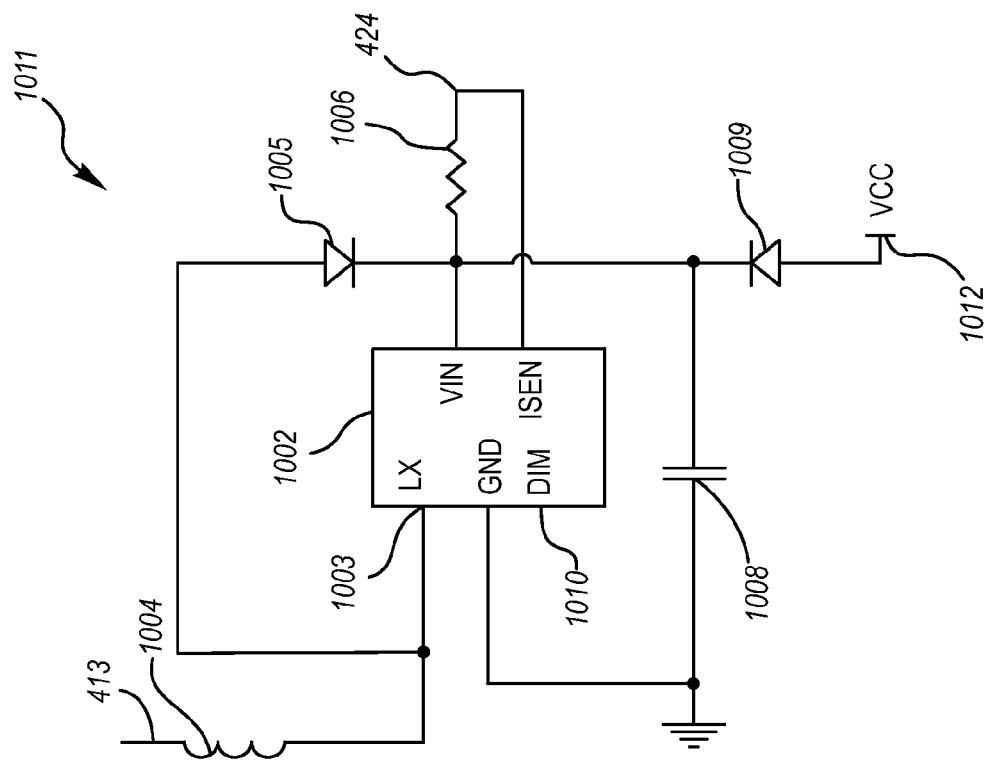
Figure 10:
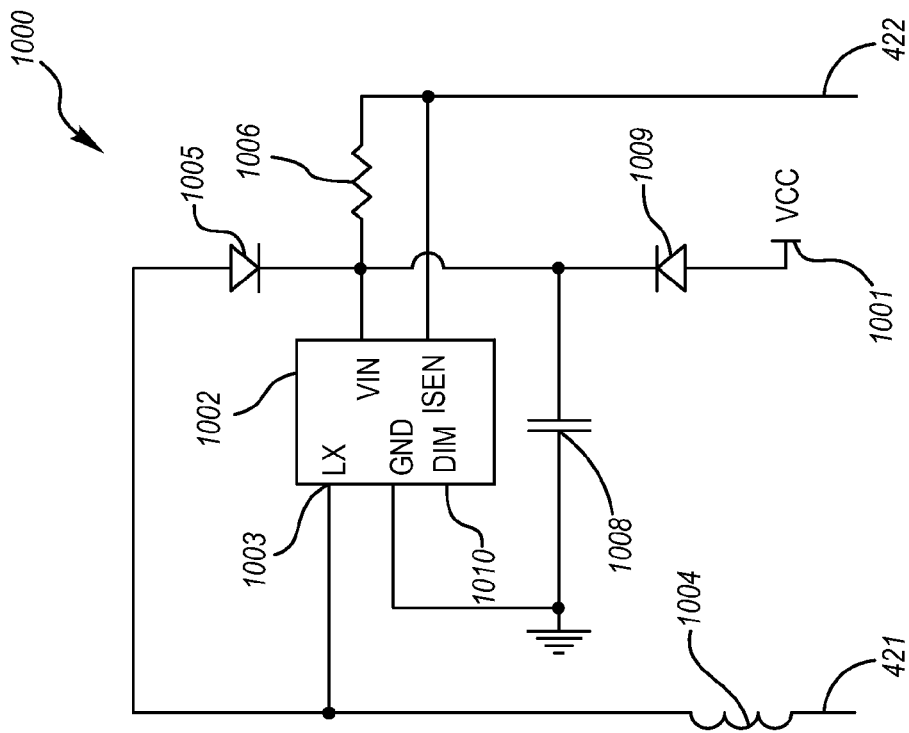

FIG. 10 shows an LED driver 1000 for a third LED group that electrically couples with cathode 421 and anode 422 for a first color to an electrical bus at point 1001. FIG. 9 also shows a LED driver 1011 for a fourth LED group with cathode 423 and anode 424 for a first color that couples to an electrical bus at point 1012. Elements 802-810 in FIG. 8 are identical to elements 502-510 in FIG. 5.

We claim:
1. A light system comprising:
    a plurality of light emitting diode (LED) groups arranged in a light bar, each group of the plurality of LED groups comprising at least two LED's wherein:
    a first LED of an LED group from the plurality of LED groups is configured to emit a first color upon application of a voltage to a first anode on the first LED wherein;
    a plurality of first LEDs from the plurality of LED groups are configured together to form a first string circuit, wherein the first string circuit is independently coupled to at least one electrical bus;
    a second LED in a same LED group as the first LED from the plurality of LED groups is configured to emit a second color upon application of a voltage to a second anode on the second LED wherein;
    a plurality of second LEDs from the plurality of LED groups are configured together to form a second string circuit, wherein the second string circuit is independently coupled to the at least one electrical bus; and
    the at least one electrical bus is electrically coupled to the plurality of LED groups and configured to turn on or off one of the first color of the first LED and the second color of the second LED when the electrical bus electrically coupled to at least the first and second anodes is electrically coupled to at least one switch, the switch including at least three settings, comprising:
        a first ON setting creating a low resistance electrical coupling between the first anode of the first LED and the switch input;
        an OFF setting creating high resistance electrical coupling between the first anode of the first LED and the second anode of the second LED and the switch input; and
        a second ON setting creating a low resistance electrical coupling between the second anode of the second LED and the switch input.

2. The light system of claim 1, wherein the first LED and second LED are surrounded by a reflective material in a same package wherein the emitted light from the first and second LED's co-illuminates a lens.

3. The light system of claim 1, wherein the first LED and second LED are electrically coupled to the electrical bus through a LED driver.

4. The light system of claim 1, wherein the first LED and second LED are mounted directly on a printed circuit board and heat sink wherein the emitted light from the first and second LED's co-illuminates a lens.

5. The light system of claim 1 further comprising a third LED in a same LED group as the first LED and the second LED, the third LED configured to emit a third color upon application of a voltage to a third anode on the third LED; wherein a plurality of third LEDs from the plurality of LED groups are configured together to form a string circuit.

6. The light system of claim 5 wherein the third anode is electrically coupled to the electrical bus and the switch further comprises a third ON position that creates a low resistance electrical coupling between the third anode of the third LED and the input of the switch.

7. The light system of claim 6 wherein the first LED, second LED, and third LED are in a same package surrounded by a reflective material.

8. The light system of claim 5, wherein the first LED, the second LED, and the third LED are mounted directly on a printed circuit board and heat sink.

9. The light system of claim 8, wherein the emitted light from the first, second, and third LED's co-illuminate a lens.

10. The light system of claim 1, wherein the plurality of LED's includes twenty LED's arranged in two rows in the light bar.

11. The variable color light display device of claim 10, wherein the plurality of variable color LED's are dual-color LED chips.

12. The light system of claim 1, wherein the first color is white and the second color is amber.

13. The light system of claim 1, wherein the light bar is configured to couple to a vehicle, an off-road vehicle, a recreational vehicle, or a boat.

14. The light system of claim 1, wherein additional resistance is added to the anode of the first or second LED to reduce the current flow to the first LED or the second LED.

15. The variable color light display device of claim 14, wherein the light bar is configured to couple to a vehicle, an off-road vehicle, a recreational vehicle, or a boat.

16. A variable color light display device, comprising:
a plurality of variable color light emitting diode (LED) groups arranged in a light bar, wherein:
a plurality of first variable colors from the plurality of variable color LED groups are configured together to form a first string circuit, wherein the first string circuit is independently coupled to a first bus;
a plurality of second variable colors from the plurality of variable color LED groups are configured together to form a second string circuit, wherein the second string circuit is independently coupled to the first bus; and
the variable color LED groups further comprising LED's having at least three electrical contacts wherein:
a first electrical contact is common to the plurality of variable color LED groups and is coupled to the first bus;
a second electrical contact is electrically coupled to a first color of the variable color LED groups and is electrically coupled to a second bus; and
a third electrical contact is electrically coupled to a second color of the variable color LED groups and is electrically coupled to a third bus.

17. The variable color light display device of claim 16, further comprising a fourth electrical lead coupled to a third color of the variable color LED's, wherein a plurality of third variable colors from the plurality of variable color LED groups are configured together to form a third string circuit, wherein the third string circuit is independently coupled to the first bus.

18. The variable color light display device of claim 16 configured to turn on the first color and the second color when a voltage source is electrically coupled to the first, second, and third buses, and further configured to:
complete a circuit for the first color by electrically coupling the second bus to the voltage source;
complete a circuit for the second color by electrically coupling the third bus to the voltage source; and
turn off the variable color LED's by disconnecting both the second bus and the third bus from the voltage source.

19. The variable color light display device of claim 16, wherein the plurality of variable color LED's are arranged in a light bar.

20. A variable color light display device, comprising:
a display device having a plurality of variable color light emitting diodes (LED) among a plurality of LED groups wherein the plurality of LED groups are surrounded by a reflective material;
a first display area configured to display at least two colors of the LED groups; and
an electrical bus coupled to the variable color LED's and configured to turn on one of the first color and the second color of the variable color LED's when electrical current flows from the electrical bus to the plurality of LED groups, wherein each LED group has a separate electrical coupling to the electrical bus.

21. The variable color light display device of claim 20, wherein the first display area is a light bar.

22. The variable color light display device of claim 21, wherein the light bar is configured to couple to a vehicle, an off-road vehicle, a recreational vehicle, or a boat.

23. The variable color light display device of claim 20, wherein the light bar comprises twenty dual LED's arranged in at least one row.

24. The variable color light display device of claim 20, wherein the light bar comprises twenty dual LED's arranged in two rows.

25. The variable color light display device of claim 20, wherein the variable color LED's are variable color LED's, each variable color LED configured to emit at least two colors.

* * * * *